(12) United States Patent
Goto et al.

(10) Patent No.: US 7,051,499 B2
(45) Date of Patent: May 30, 2006

(54) RIDING MOWER PROVIDED WITH HYDROSTATIC TRANSMISSIONS

(75) Inventors: Renshi Goto, Iyo-gun (JP); Suguru Okamoto, Iyo-gun (JP); Katsutoshi Akamatsu, Iyo-gun (JP)

(73) Assignee: Iseki & Co., Ltd., Matsuyama (JP)

( * ) Notice: Subject to any disclaimer, the term of this patent is extended or adjusted under 35 U.S.C. 154(b) by 0 days.

(21) Appl. No.: 10/789,259

(22) Filed: Feb. 26, 2004

(65) Prior Publication Data

US 2005/0044836 A1    Mar. 3, 2005

(30) Foreign Application Priority Data

Aug. 28, 2003 (JP) ............................. 2003-304826
Oct. 16, 2003 (JP) ............................. 2003-356878

(51) Int. Cl.
*A01D 34/03* (2006.01)
(52) U.S. Cl. .................................................. 56/14.9
(58) Field of Classification Search ................ 56/14.7, 56/14.9
See application file for complete search history.

(56) References Cited

U.S. PATENT DOCUMENTS

| 4,356,773 A | * | 11/1982 | van Eyken ................ 105/26.1 |
| 4,694,942 A | * | 9/1987 | Ogano et al. .............. 192/13 A |
| 4,869,054 A | * | 9/1989 | Hostetler et al. ................. 56/6 |
| 5,042,238 A | * | 8/1991 | White et al. .................. 56/11.8 |
| 5,163,274 A | * | 11/1992 | Burdsall et al. ............. 56/14.9 |
| 5,765,347 A | * | 6/1998 | Wright et al. ................ 56/14.7 |
| 6,438,930 B1 | * | 8/2002 | Velke et al. ................. 56/14.7 |
| 6,604,348 B1 | * | 8/2003 | Hunt .......................... 56/10.6 |

FOREIGN PATENT DOCUMENTS

| JP | 2000-071790 | 3/2000 |
| JP | 2000-270652 | 10/2000 |

\* cited by examiner

*Primary Examiner*—Thomas B. Will
*Assistant Examiner*—Alicia Torres
(74) *Attorney, Agent, or Firm*—Intellectual Property Law Group LLP; Otto O. Lee; Juneko Jackson (57) ABSTRACT

As an embodiment of the present invention, a brake pedal 69 for braking right and left rear wheels 3 and a parking operation member 78 for maintaining a step-on condition of the brake pedal 69 are provided on a step 67. As a result, the step-on condition of the brake pedal 69 can be maintained by, for example, stepping on the parking operation member 78 with the left foot after applying the step-on brake of the brake pedal 69 with the right foot. Thus the body can be stopped without using hands and the stopped condition can be maintained over an extended period of time. Braking and parking operations of the body are simple, and moreover, an improved right-and-left weight balance of the body improves the traveling body in operation, and operations at the mower deck side. In particular, operation related to mowing height adjustment can be improved.

1 Claim, 13 Drawing Sheets

RIDING MOWER PROVIDED WITH HYDROSTATIC TRANSMISSIONS

BACKGROUND OF THE INVENTION

1. Field of the Invention

The present invention relates to a construction of a riding mower comprising caster-type right and left front wheels and driven-type right and left rear wheels, wherein a mower deck is mounted between the front and rear wheels so as to be capable of being lifted up and down.

2. Description of the Related Art

A riding mower having right and left independent hydrostatic transmissions (HSTs), capable of operating a pair of right and left steering levers in the back-and-forth direction to individually actuate these hydrostatic transmissions (HSTs) to advance or retract the body or reversing one to perform an on-the-spot ground turn is known in the art.

In such a riding mower, a brake pedal to stop the body and a brake operation member for parking are provided at separate positions. For a parking operation, an operator must perform a parking operation while letting go of the steering levers. In addition, the above-described riding mower is, as disclosed in Japanese Published Unexamined Patent Application No. 2000-270652, structured so that power from an engine is distributed right and left via a power distribution apparatus and the distributed power is transmitted to drive wheels via right and left hydrostatic transmissions (HSTs), and to a mower, power is transmitted through a PTO shaft protruded forward from a power distributing portion. However, this PTO shaft exists at the center in the right and left direction of the body, and in particular, when a mower deck of a three cutting blade-type is mounted, the right-and-left-balance of the body is hindered since the exhaust side is heavy. In addition, the body may be inclined toward the exhaust side, which hinders straight traveling even when a straight advance of the body is intended.

Furthermore, a mowing height adjusting mechanism of a riding mower has been provided in a link portion for coupling a mower deck as shown in Japanese Published Unexamined Patent Application No. H06-113645. However, when changing the mowing height, the trouble of having to get off of the vehicle body each time for a change and perform a change operation of a height adjuster has been necessary.

SUMMARY OF THE INVENTION

It is an object of the present invention to make braking and parking operations of the body simple, and moreover, to improve the operation of the traveling body compared to the prior art by an improved right-and-left weight balance of the body, and to improve operations at the mower deck side, in particular, operations related to the mowing height adjustment compared to the prior art.

A first aspect of the present invention provides a riding mower comprising: an engine 4 arranged on a body; front wheels 2 and rear wheels 3 supported on the body and provided right and left, each in pairs toward the forward direction; a pair of hydrostatic transmissions (HSTs) 24 and 24 driven by receiving a revolving power of the engine 4, for rotating the pair of rear wheels 3 and 3 in the forward rotational direction or reverse rotational direction; a mower 43 positioned in front of the pair of rear wheels 3 and 3 and coupled to the body so as to be capable of being lifted up and down; a step 67 provided above the body; a brake pedal 69 for braking the pair of rear wheels 3 and 3, provided on upward of the step 67; and a parking operation member 78 for maintaining a step-on condition of the brake pedal 69.

A second aspect of the present invention provides the riding mower as defined in claim 1 (the first aspect of the invention), comprising: a pair of mower elevating links 51 and 51 for coupling between the body and mower 43; a lift shaft 53 for rotating the pair of elevating links 51 and 51, respectively, provided in the right and left direction at a side connecting portion to the body in the pair of elevating links 51 and 51; a hydraulic cylinder 52 for elevating the mower 43 by rotating the lift shaft 53; and a rotating shaft 69b of the brake pedal 69 provided concentrically with the lift shaft 53.

A third aspect of the present invention provides a riding mower comprising: an engine 4 arranged on a body; front wheels 2 and rear wheels 3 supported on the body and provided right and left each in pairs toward the forward direction; a pair of hydrostatic transmissions (HSTs) 24 and 24 driven by receiving a revolving power of the engine 4, for rotating the pair of rear wheels 3 and 3 in the forward rotation direction or reverse rotation direction, provided with a pair of variable capacity pumps 25 and 25 and a pair of hydraulic motors 27 and 27; a mower 43 positioned in front of the pair of rear wheels 3 and 3 and coupled to the body so as to be capable of being lifted up and down; and a PTO shaft 42, on which the pair of variable capacity pumps 25 and 25 are provided front and back in a row, for driving the mower 43 provided in parallel with these variable capacity pumps 25 and 25.

A fourth aspect of the present invention provides a riding mower comprising: an engine 4 arranged on a body; front wheels 2 and 2 and rear wheels 3 and 3 supported on the body and provided right and left, each in pairs toward the forward direction; a pair of hydrostatic transmissions (HSTs) 24 and 24 driven by receiving revolution power of the engine 4, for rotating the pair of rear wheels 3 and 3 in the forward rotational direction or reverse rotational direction, provided with a pair of variable capacity pumps 25 and 25 and a pair of hydraulic motors 27 and 27; a mower 43 positioned in front of the pair of rear wheels 3 and 3 and coupled to the body so as to be capable of being lifted up and down; the PTO shaft 42 for driving the mower 43 provided in a manner one-sided to the right or left with respect to a centerline S that is in the right and left direction in terms of the forward direction; and the pair of variable capacity pumps 25 and 25 provided on the side opposite the PTO shaft 42 with respect to the center line S in the right and left direction.

A fifth aspect of the present invention provides a riding mower comprising: an engine 4 arranged on a body; front wheels 2 and 2 and rear wheels 3 and 3 supported on the body and provided right and left, each in pairs toward the forward direction; a pair of hydrostatic transmissions (HSTs) 24 and 24 driven by receiving revolution power of the engine 4, for rotating the pair of rear wheels 3 and 3 in the forward rotation direction or reverse rotation direction; a mower 43 positioned in front of the pair of rear wheels 3 and 3 and coupled to the body so as to be capable of being lifted up and down; a pair of mower elevating links 51 and 51 for coupling between the body and a front side of the mower 43; a rotary adjuster 190 for adjusting a lowering position of the mower 43 by adjusting, in stages, a rotating range of the pair of link arms 51 and 51 provided on the body; an operator's seat 28 provided on the body; a dial-type mowing height setter 175a provided in the vicinity of the operator's seat 28; and a mechanical interlocking member 175e mechanically interlocking and coupling the mowing height setter 175a with the rotary adjuster 190.

According to the first aspect of the present invention, since the brake pedal 69 for braking the right and left rear wheels 3 and 3 and the parking operation member 78 for maintaining a step-on condition of the brake pedal 69 are provided on the step 67, a step-on condition of the brake pedal 69 can be maintained by, for example, stepping on the parking operation member 78 with the left foot after applying a step-on brake of the brake pedal 69 with the right foot, thus the body can be stopped without using hands whereby the stopped condition can be maintained over an extended period of time.

According to the second aspect of the present invention, since the brake pedal 69 can be supported so as to allow a step-on operation by utilizing the lift shaft 53 to elevate the mower 43, construction around the brake operating portion is simplified, no extra shaft to support the brake pedal 69 is required, and the number of components is also reduced, and the whole mower can be constructed at a reasonable price.

According to the third aspect of the present invention, since the pair of variable capacity pumps 25 and 25 are provided in a front and back direction, and on the side thereof, the PTO shaft 42 is also provided in a manner maintaining a parallel condition, therefore, compared to a case where the variable capacity pumps 25 and 25 are provided in a row in the right and left direction, the breadth of the body does not become wide, thus the body can be constructed with a compact size.

According to the fourth aspect of in present invention, since the PTO shaft 42 is off-center to one side with respect to the center in the right and left direction of the body, even the mower 43 whose discharge port side is heavy can be balanced right and left when being hoisted, and straight traveling performance of the body can be kept satisfactory.

In addition, according to the fifth aspect of the present invention, since the adjuster 190 on the link arm 51 side can be remotely operated by the setter 175*a* of the operator's seat 28 side, an operator can change a mowing height of the mower 43 while remaining seated on the operator's seat 28, and avoid the trouble of having to get off the vehicle body as described above, and operation of the riding mower can be improved.

DETAILED DESCRIPTION OF THE PREFERRED EMBODIMENTS

A riding mower is provided, wherein a brake pedal and a parking operation member are both provided in the vicinity of an upper-surface central part of a step of a body; a pair of variable capacity pumps are provided front and back in a row while being under a seat and on a right side of the body center; a PTO shaft is provided in parallel with these variable capacity pumps; and this PTO shaft is coupled to a mower-side input shaft by a universal joint to transmit power.

Embodiment 1

Hereinafter, an embodiment of the present invention will be described based on the drawings.

First, as a description of the construction, a riding-type lawn mower 1 is provided with front wheels 2 and 2 and rear wheels 3 and 3; the front wheels 2 and 2 are composed of non-driven-type caster wheels, and the rear wheels 3 and 3 are driven by the power of engine 4.

The engine 4 is provided at a rear part of the body, and is elastically supported via four vibration isolators (illustration omitted) between a pair of right and left main frames 6 and 6 provided along the anteroposterior direction.

The engine 4 is positioned more rearward than axles 3*a* and 3*a* of the rear wheels 3 and 3 in a view from the lateral side, and above the same, a muffler 9 and an air cleaner 10 are disposed. A tail pipe 9*a* of the muffler 9 is provided in a downwardly extending manner from a main-body portion and orients its exhaust opening portion laterally outward.

In addition, in the rearward direction of the engine 4, a suction fan 12, a radiator 13, and on oil cooler 14 are provided in this order.

Furthermore, outer peripheral parts such as the engine 4, muffler 9, air cleaner 10, and radiator 13 are covered with a box-shaped bonnet 16, and this bonnet 16 is constructed so that its front side can be significantly opened upward around a fulcrum provided at a lower rear part. A slit-like fresh air intake 16*a* is provided on the rear surface of the bonnet 16 so that cold fresh air is taken into the bonnet 16 through this fresh air intake 16*a* to cool auxiliary components such as the muffler 9 and air cleaner 10 on the periphery of the engine 4.

On the other hand, a transmission case 18 is provided in front of the engine 4, and an input shaft 19 provided on the transmission case 18 is coupled with an output shaft 20 of the engine 4 side by a universal joint 22. On one side of the right and left (in FIG. 2, the right side in the forward direction) of the transmission case 18, variable capacity-type hydraulic pumps 25 and 25 of a pair of hydrostatic transmissions (HSTs) 24 and 24 are provided front and back in a row in a condition where their rotation shaft centers coincide, and while the engine 4 is in operation, the hydraulic pumps 25 and 25 are driven at all times by a drive mechanism composed of a plurality of gear groups provided in the transmission case 18.

Hydraulic motors 27 and 27 of the hydrostatic transmissions (HSTs) 24 and 24 are provided in the vicinity of axial supporting portions of the rear wheels 3 and 3, and the number of rotations and rotating direction of the hydraulic motors 27 and 27 are changed by adjusting the angle of swash plates (illustration omitted) of the hydrostatic transmissions (HSTs) 24 and 24. These hydraulic motors 27 and 27 are detachably attached to motor bracket 23 and 23 fixedly fitted to the outside of the main frames 6 and 6. In addition, adjustment of the swash plates of the hydraulic pumps 25 and 25 of the hydrostatic transmissions (HSTs) 24 and 24 is performed by operating in the back-and-forth direction a pair of right and left steering levers 30 and 30 provided at the front part of an operator's seat 28.

Figure 4:
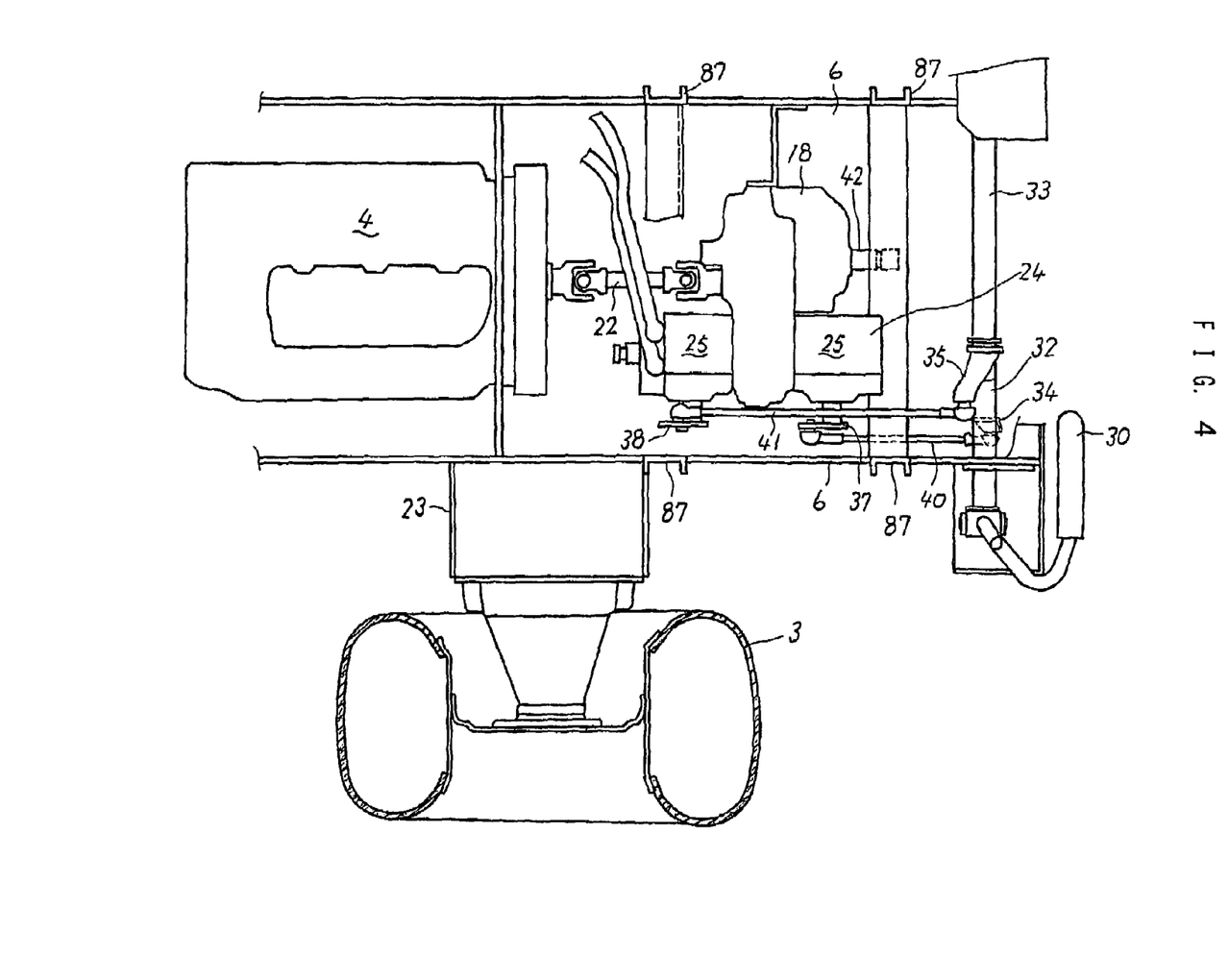
FIG. 4 is an enlarged plan view in the vicinity of an HST.
Figure 5:
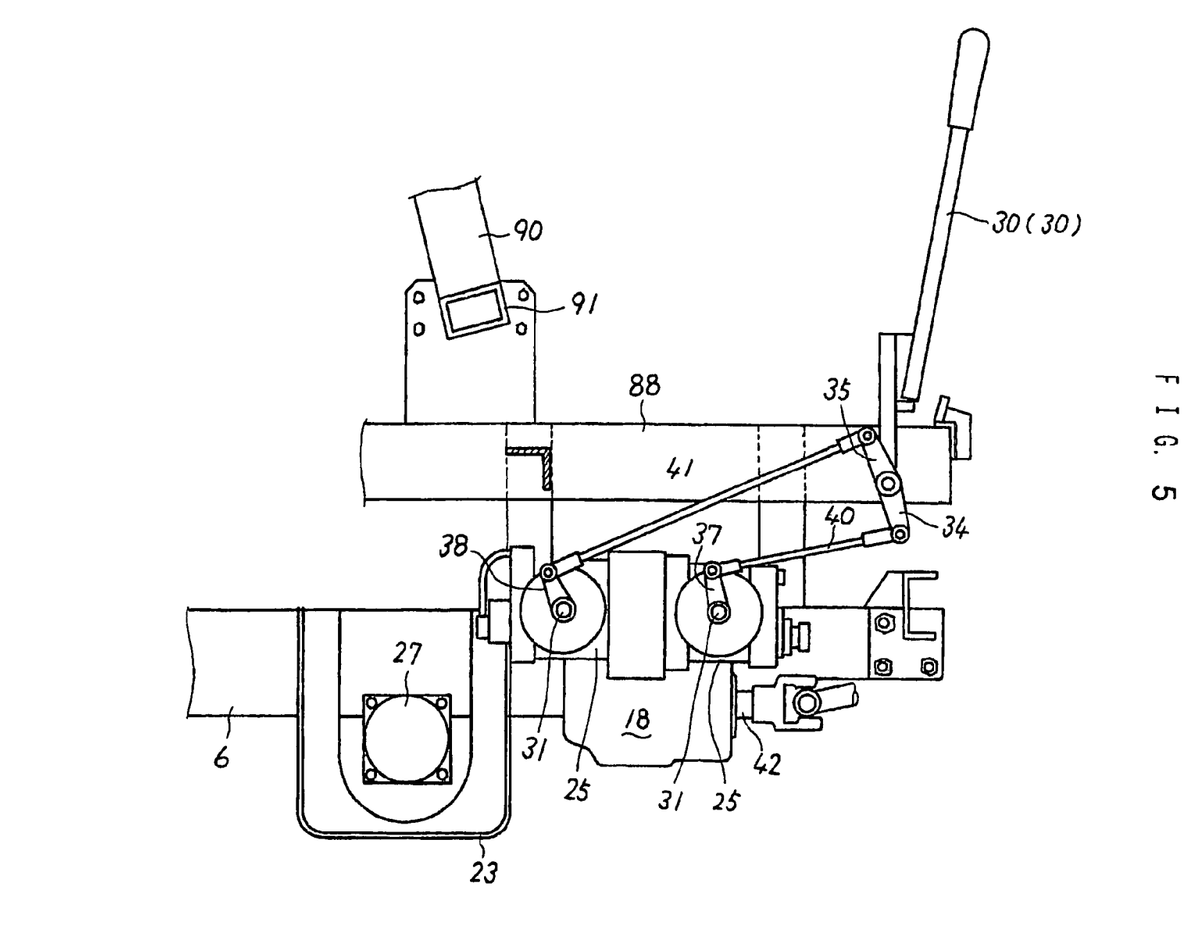
FIG. 5 is an enlarged side view in the vicinity of an HST.

Next, description will be given of an interlocking relationship between the steering levers 30 and 30 and trunnion shafts 31 and 31 of the side of hydraulic pumps 25 and 25 with reference to FIG. 4 and FIG. 5. On a rotation shaft 32 of the right steering lever 30 composed of a cylindrical body, a downwardly protruding arm member 34 integrated with the same is provided, and similarly, on a rotation shaft 33 of the left steering lever 30 composed of a cylindrical body, an upwardly protruding arm member 35 integrated with the same is provided, and these arm members 34 and 35 are interlocked and coupled by plates 37 and 38 and rods 40 and 41 fixedly fitted to the trunnion shafts 31 and 31 of the hydraulic pumps 25 and 25, respectively. When the respective steering levers 30 and 30 are shifted forward from a neutral position where the body is stopped, the trunnion shafts 31 and 31 of the respective hydrostatic transmissions (HSTs) 24 and 24 are rotated in the normal rotational direction so that the body is advanced, and alternatively, when the steering levers 30 and 30 are drawn back rearward from the neutral position, the trunnion shafts 31 and 31 are turned in the reverse rotational direction so that the body is retracted. When the right and left steering levers 30 and 30 are operated in mutually opposite directions, one trunnion shaft 31 is normally rotated, and the other trunnion shaft is reversely rotated so that a spin turn can be performed on the spot.

Moreover, although illustration is omitted, the two steering levers 30 and 30 can be turned, at the neutral position, in an outward direction perpendicular to the operating direction, and if the levers are turned as such, the distance between the steering levers 30 and 30 is widened to allow an operator to pass between the steering levers 30 and 30, making it easy for an operator to get on and off.

Next, description will be given of a structure and a driving system of the mower 43.

Figure 2:
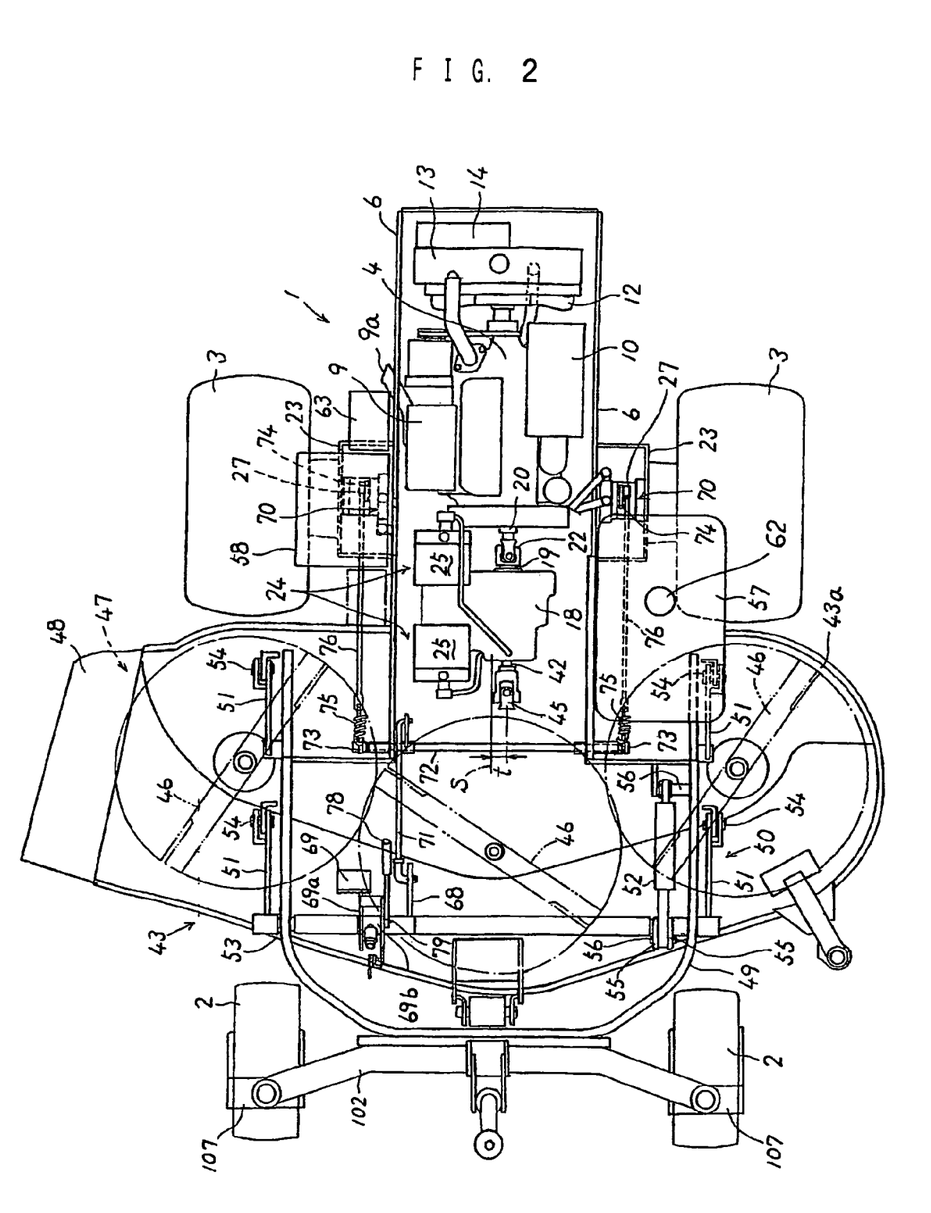
FIG. 2 is a whole plan view of a riding mower.

On a front part of the transmission case 18, a PTO shaft 42 is axially extended in a forward protruding manner, and a universal joint shaft 45 is detachably intervened and coupled between a mower 43-side input shaft 44 intervened between the front wheels 2 and 2 and rear wheels 3 and 3, and the PTO shaft 42. To the PTO shaft 42, power of the engine is transmitted or interrupted by connecting or disconnecting a hydraulic clutch (illustration omitted) provided in the transmission case 18. The axis center of the PTO shaft 42 is off-center to the left side by a distance t with respect to the center S in the right and left direction of the body as shown in FIG. 2, and since a mower deck 43a itself is also one-sided to the left side, the input shaft 44 of the mower 43 is also made off-center by a distance t to left.

Normally, a discharge cover is mounted to a mown-grass discharging port 47-side of the mower 43 so as to prevent discharged grass and small stones from scattering upward. However, when this cover is mounted, the discharge port side of the right side results in a heavy condition. Therein exists a drawback such that when the mower 43 is raised the right-and-left weight balance is hindered. As described above, when the whole mower 43 is supported on the body in a slightly left-sided manner, the weight balance, when the mower 43 is raised, is never lost, and accordingly, straight traveling performance also becomes satisfactory.

In addition, the mower 43 is provided with three mowing blades 46, 46 and 46 within its deck 43a, and when the mower 43 obtains power from the PTO shaft 42 axially supported on a gear case 43b, these cutting blades 46, 46, and 46 are all rotated clockwise in a view from the upward direction via power transmitting members such as belts and mow clippings and grass. A mown grass discharge port 47 for discharging mown clippings and grass is provided at the right side of the mower deck 43a, and mown grass is discharged outside through this discharge port 47. A discharge cover 48 which is freely turnable up and down is provided above the discharge port 47, and the whole cover is pressed and urged downward so that mown grass in the mower deck 43a is guided only laterally outward.

As to a description of an elevating mechanism of the mower deck 43a, the mower deck 43a is supported so as to be capable of being lifted up and down via link mechanisms 50 and 50 on a front frame 49 coupled with front parts of the main frames 6 and 6. The whole mower deck 43a moves up and down approximately parallel to the ground when a hydraulic oil is supplied to or discharged from a single hydraulic cylinder 52 provided on one side of the body front.

In greater detail, the link mechanism 50 is provided with four, approximately equally long, link pieces 51, 51, 51, and 51 at its front, back, right, and left. The front-side link pieces 51 and 51 are attached to both ends of one lift shaft 53 extended to the right and left at a front part of the front frame 49. The rear-side link pieces 51 and 51 are pivotally fitted at a rear-sided middle part of the front frame 49. Lower end parts of the respective link pieces 51, 51, 51, and 51 are coupled to the mower deck 43a side by pins 54, 54, 54, and 54.

In addition, at the left side of the lift shaft 53, two arms 55 and 55 are fixed to face upward, and a front end of the hydraulic cylinder 52 is coupled to tip portions of these arms 55 and 55 by use of a pin 56. A rear end of the hydraulic cylinder 52 is pivotally fitted to a left inside part of the front frame 49 by a pin 56.

Accordingly, when a hydraulic cylinder 52, which is an actuator, is made to supply or discharge hydraulic oil to expand or contract its piston, the lift shaft 53 is rotated to turn the link mechanisms 50 and 50 up and down so that the mower deck 43a is raised or lowered.

Next, description will be given of rear-wheel braking units and an operation mechanism thereof.

Figure 1:
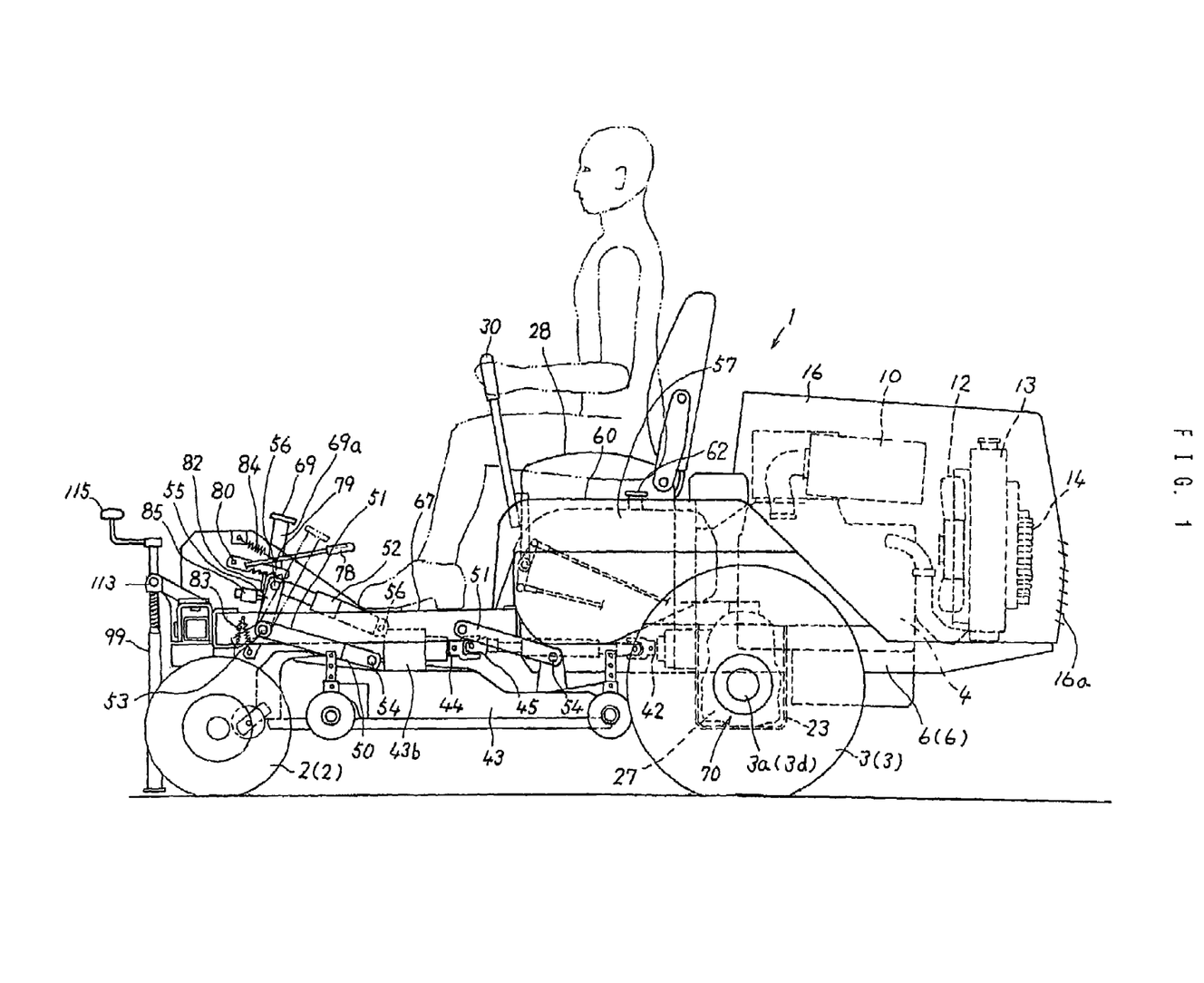
FIG. 1 is a whole side view of a riding mower.

As shown in FIG. 1, a single-piece step 67 whose front part rises slantwise and which has, as a whole, a foot rest portion that is flat in the right and left lateral direction, is attached to the upper surface of the front frame 49. An arm 69a of the brake pedal 69 faces the front part of this step 67, and rear-wheel braking units 70 and 70 are actuated by an operator stepping on the upper surface of a brake pedal 69 (solid lines of FIG. 1).

In greater detail, the rear-wheel braking units 70 and 70 are provided on upper parts of the hydraulic motors 27 and 27, and the right and left rear-wheel brake units 70 and 70 are simultaneously made to work by stepping on the brake pedal 69.

The lift shaft 53 is fitted to turn freely around a turn boss 69b of the brake pedal 69, and a plate 68 is fixedly fitted to the boss 69b when the brake pedal 69 is stepped on, and this movement is transmitted to a relay shaft 72 at the body center via one rod 71.

Rods 76 and 76 having springs 75 and 75 at their front end parts are intervened and coupled between plates 73 and 73 which are fixedly fitted to both right and left sides of the relay shaft 72 and arms 74 and 74 protruding upward from the rear-wheel brake units 70 and 70. Accordingly, when the brake pedal 69 is stepped on, the brake units 70 and 70 are simultaneously actuated via the rod 71, relay shaft 72, and rods 76 and 76, in order.

A parking operation member (operation pedal) 78 to maintain a step-on condition of the brake pedal 69 is provided in a manner approximately to a lateral side part, and immediately to the left side of the brake pedal 69. The parking operation pedal 78 is constructed integrally with a latching plate 79 having a serrated latching portion, and these can be turned around a fulcrum 80.

The serrated latching portion formed on the lower surface of the latching plate 79 is constructed so as to be capable of mating with the upper surface of a plate body 82 fixedly fitted to an arm 69*a* front part of the brake pedal 69. When an operator brakes by stepping on the brake pedal 69 with his/her right foot and then, while maintaining this condition, steps on the parking operation pedal 78 with his/her left foot, teeth of the serrated latching portion of the latching plate 79 are caught on an upper part of the plate body 82 integrated with the brake pedal 69 to maintain the step-on condition of the brake pedal 69.

Herein, of the two return springs 83 and 84 of the drawing, the return spring 83 is for returning the brake pedal 69 to a condition before being stepped on, and the return spring 84 is for drawing back the parking operation pedal 78 in a releasing direction. The parking operation pedal 78 is drawn back upward by the return spring 84 if no parking operation is performed, therefore, the serrated latching portion never mates with the plate body 82 of the brake pedal 69. Numerical symbol 85 denotes a start switch of the engine 4, and in this embodiment, the arm 69*a* of the brake pedal 69 pushes the switch 85 to turn the switch 85 ON when the brake pedal 69 is stepped on. Starting the engine 4 is possible only when this switch 85 is ON and the PTO shaft 42 is in a non-driven condition not to rotate, and furthermore, the steering levers 30 and 30 are in the neutral position.

For simplifying a start circuit of the engine 4, this can be an electrical circuit to allow the engine 4 to start only when the start switch 85 is ON.

Moreover, the brake pedal 69 may be provided on the right side of the step 67, but may be on the left side. In addition, the step-on-type parking operation pedal 78 may be replaced by a lever-type operation pedal to allow manual operation.

Description will now be given of an attachment construction between a fuel tank 57 and a hydraulic oil tank 58. The fuel tank 57 is, as shown in FIG. 1 and FIG. 2, provided at a lateral side of the operator's seat 28, and in a view from the lateral side, a bottom portion of the fuel tank 57 is tilted so as to gradually become distant from the ground as it goes to the rearward. Upward of the fuel tank 57 is covered by a left fender 60, and only an oil supply port 62 appears from the upper surface of the fender 60.

On the other hand, at a side opposite to the fuel tank 57 in terms of right and left, the hydraulic oil tank 58 to store a hydraulic oil of the hydrostatic transmissions (HSTs) is provided. Similar to the fuel tank 57, the hydraulic oil tank 58 is also supported on the main frame 6 by an appropriate supporting plate (illustrateion omitted). This hydraulic oil tank 58 exists in slightly the rear of the fuel tank 57, and the whole is covered by a right fender 60 together with the right rear-wheel 3.

Furthermore, in the rear of this hydraulic oil tank 58, a battery 63 is provided, and a weight equivalent to the hydraulic oil tank 58 and battery 63 is balanced with a weight of the left fuel tank 57.

Figure 3:
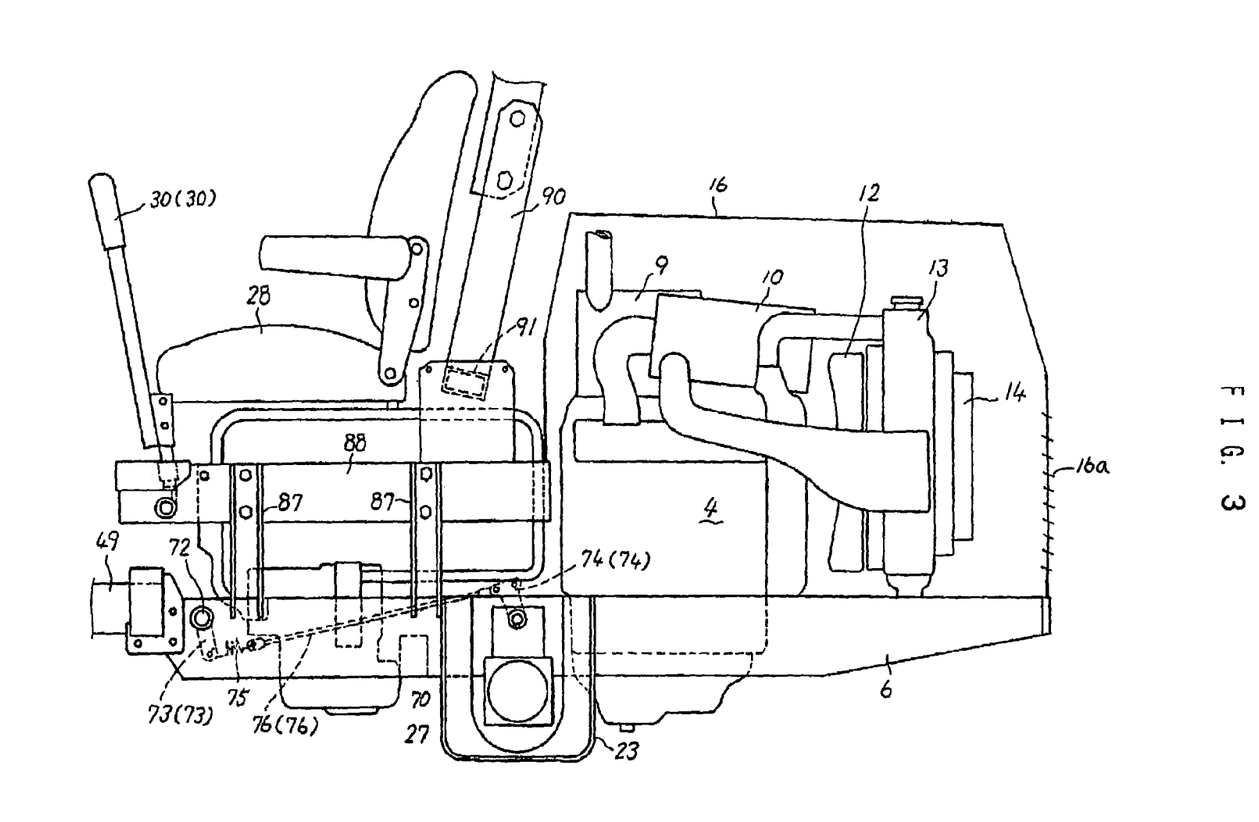
FIG. 3 is an enlarged side view of a vehicle-body portion.

Next, description will be given of detailed constructions of FIG. 3 through FIG. 6. In FIG. 3, the front frame 49 is integrally fixedly fitted to front parts of the main frames 6 and 6 by welding or bolting, therein a vehicle body is constructed. In the front parts of the main frames 6 and 6, two longitudinal frames 87 and 87 whose sections are a laid U-shape are provided in a standing condition, and between these longitudinal frames 87 and 87, a seat frame 88 is provided in a fixedly fitted manner along the anteroposterior direction, and on a rear upper part of the seat frame 88, a safety frame 90 is provided in a standing condition. The safety frame 90 is for protecting an operator when the body is turned over, and this is formed in an inverted U-shape in a view from the back, and its base portion is coupled by a frame 91 formed of a hollow pipe or an L-shaped steel pipe provided along the right and left direction to reinforce the whole safety frame 90.

Figure 6:
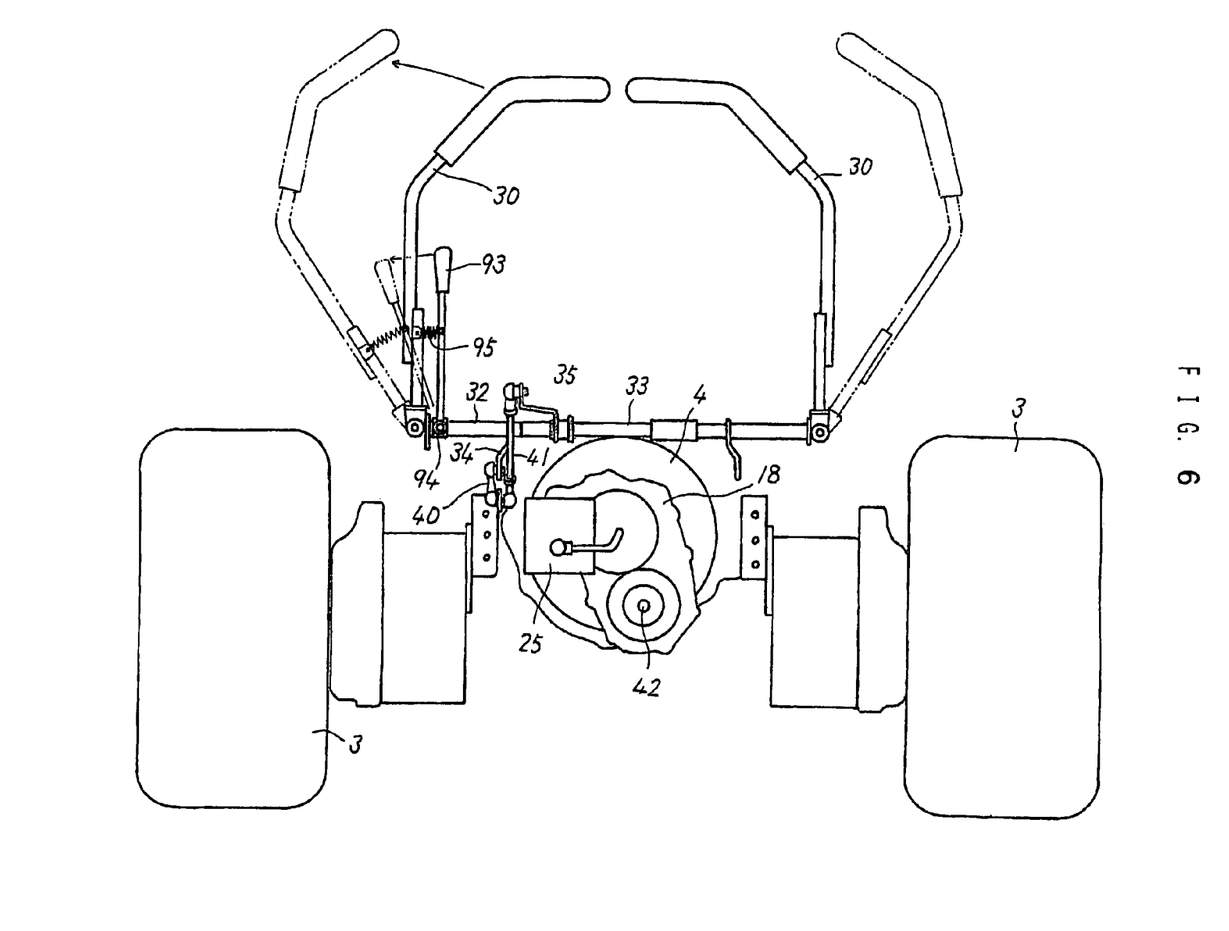
FIG. 6 is a front view showing shift lever actions.

FIG. 6 shows a relationship between a throttle lever 93 and the steering lever 30, which is a view when the body is viewed head-on. When the throttle lever 93 is turned inward around a fulcrum 94, revolution of the engine 4 is accelerated, and in contrast thereto, when the throttle lever 93 is turned outward as shown by hypothetical lines, revolution of the engine 4 is decelerated. The throttle lever 93 can be stopped at an arbitrary turning position by a lining member provided in a fulcrum 94 portion, and the throttle lever 93 is drawn back to an idling position by a spring 95 to reduce engine 4 revolutions only when the steering lever 30 is turned to the extreme end of the neutral position. By such a construction, a nearly idling condition is inevitably produced at a time of engine starting, therein exists safety without a danger of sudden acceleration of the body.

Moreover, the throttle lever 93 may be operated in the back-and-forth direction to regulate engine 4 revolution as in agricultural machines such as tractors and combines, and even in such a case, a mechanical linkage means such as a wire and a rod is utilized for interlock so that the throttle lever returns to an idling condition by turning the steering levers 30 and 30 outward.

Next, description will be given of a jack-up mechanism 100 of the front wheels 2 based on FIG. 7 through FIG. 11. A frame member 101 whose section is an inverted U-shape and whose lower part is opened is fixedly fitted to a front end part of the front frame 49, and inside of this frame member 101, a front-wheel supporting pipe 102 formed of a hollow square pipe is pivotally supported so as to be freely swingable up and down around an anteroposterior fulcrum pin 104. Pipes 105 and 105 are fixedly fitted to both the right and left ends of the front-wheel supporting pipe 102. Upper parts of front-wheel forks 107 and 107, to pivotally support the front wheels 2 and 2, are inserted in these pipes 105 and 105.

On the upper surface of the frame member 101, a receiving frame 106 whose section is a U-shape, is pivotally fitted so as to be freely turnable around a vertical pin 108 provided in the up and down direction, and a mast 110 to support the jack-up mechanism 100 is attached to this receiving frame 106 by two pins 109 and 109. When a jack 99 is used, the receiving frame 106 is turned around the vertical pin 108 to position the jack 99 in front of the body.

A cubic piece 112 is provided on an upper end part of the mast 110, and an upper end of a thread rod 114 is supported by insertion through this piece 112, a handle 115 is provided on an upper part of the thread rod 114, and a cylindrical body 116 on whose inner circumference has been engraved with threads is screwed with the thread rod 114.

Figure 10:
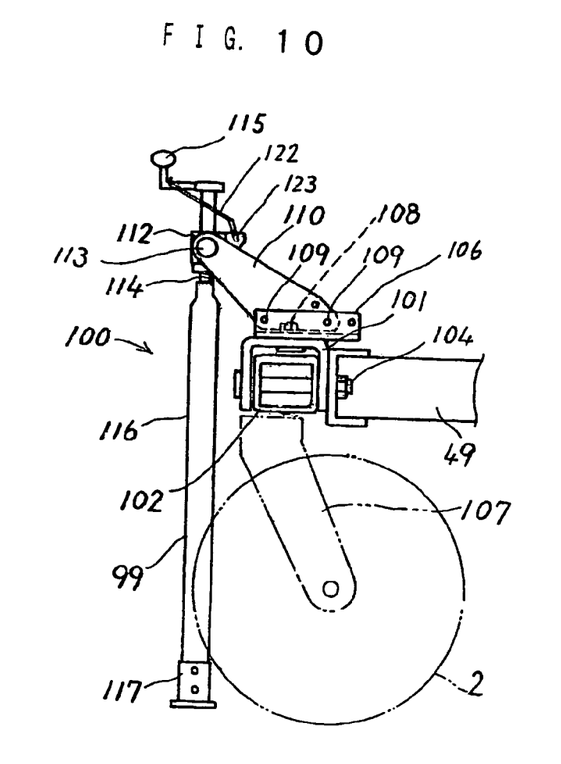
FIG. 10 is a side view before a jack is used.
Figure 11:
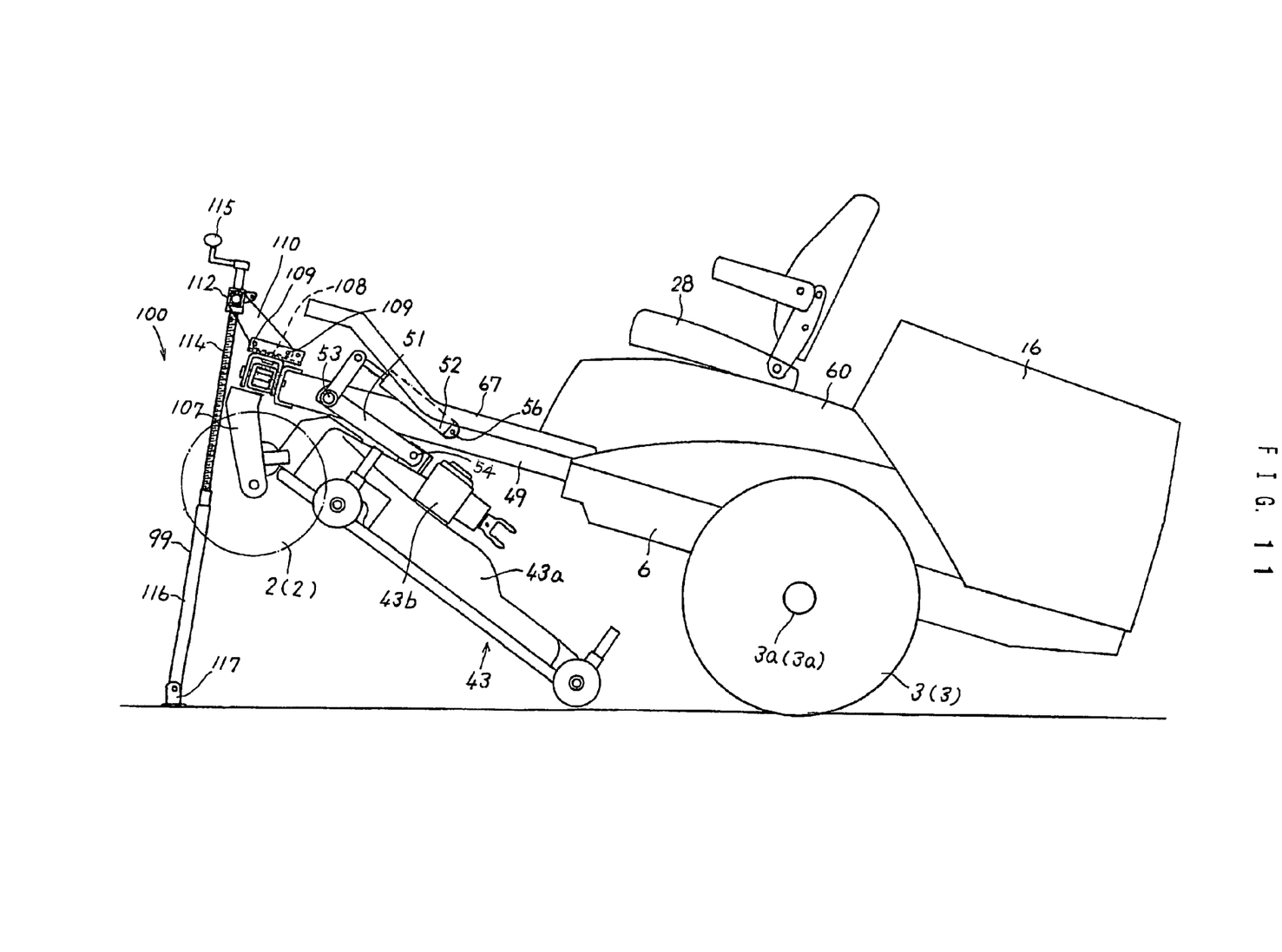
FIG. 11 is a side view during use of a jack.
Figure 12:
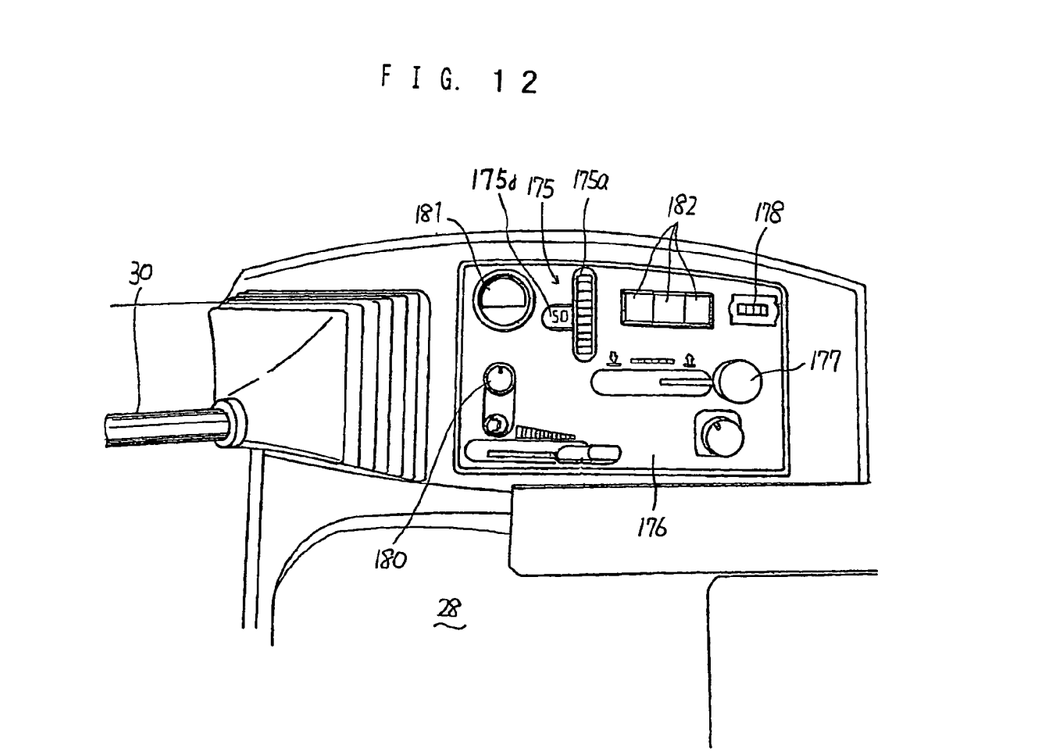
FIG. 12 is a plan view of an operation panel on a side of an operator's seat.
Figure 13:
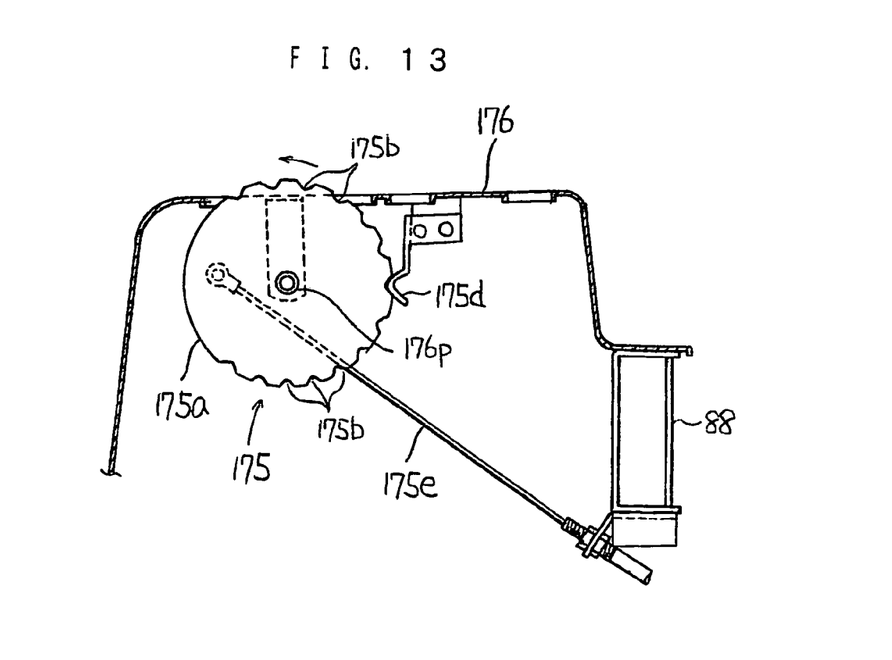
FIG. 13 is a front view of an operation panel of a dial operation portion sectioned in the right and left direction.
Figure 14:
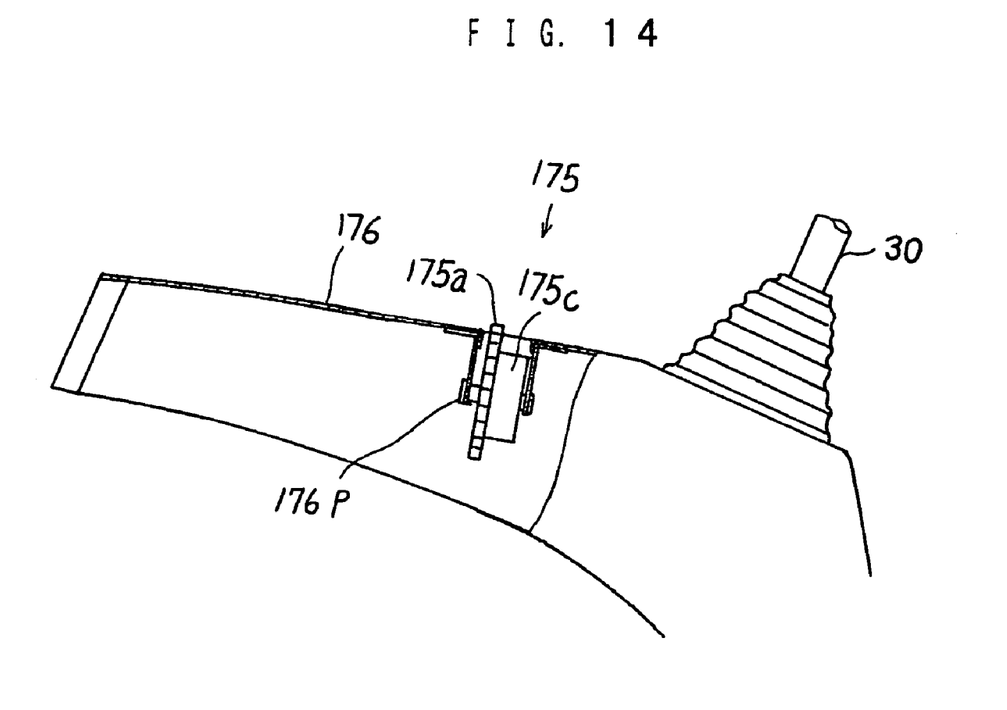
FIG. 14 is a side view of an operation panel of a dial operation portion sectioned in the back-and-forth direction.
Figure 15:
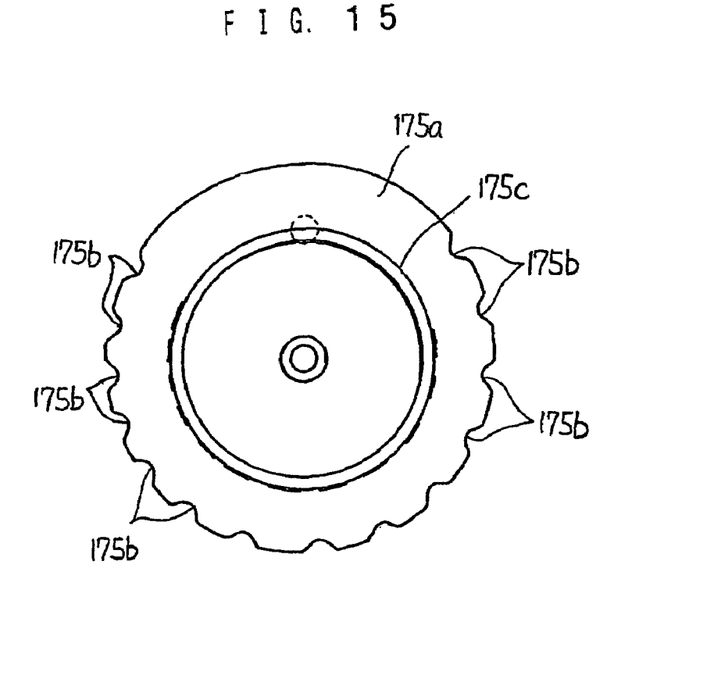
FIG. 15 is a front view of a dial operating portion.

When the handle 115 is turned while a stand 117 formed on a lower part of the cylindrical body 116 is connected to the ground, the thread rod 114 is turned with respect to the fixed cylindrical body 116 and the whole jack 99 is extended and contracted. FIG. 11 shows a condition where the body front part has been risen by use of the jack 99, and by raising the front part as such, an inspection of the mower deck 43a and replacement work for the cutting blade 46 can be easily carried out. FIG. 10 shows a condition before a lift.

As shown in FIG. 11, when the rear-side link pieces 51 and 51 are removed from the mower deck 43a, lower ends of the front-side link pieces 51 and 51 are attached to the mower deck 43a, and the hydraulic cylinder 52 is expanded in this condition. The front part of the mower deck 43a is drawn up while the rear end of the mower deck 43a is in contact with the ground, therefore, the bottom surface-side of the mower deck 43a can be seen on a large scale, thus an internal inspection and cutting blade replacement work become easy.

Figure 7:
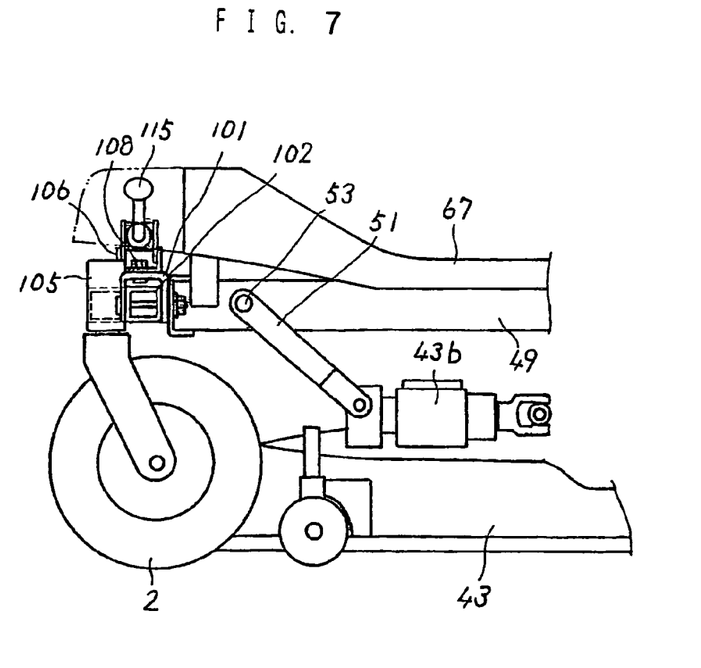
FIG. 7 is an enlarged side view when a jack is retracted.
Figure 8:
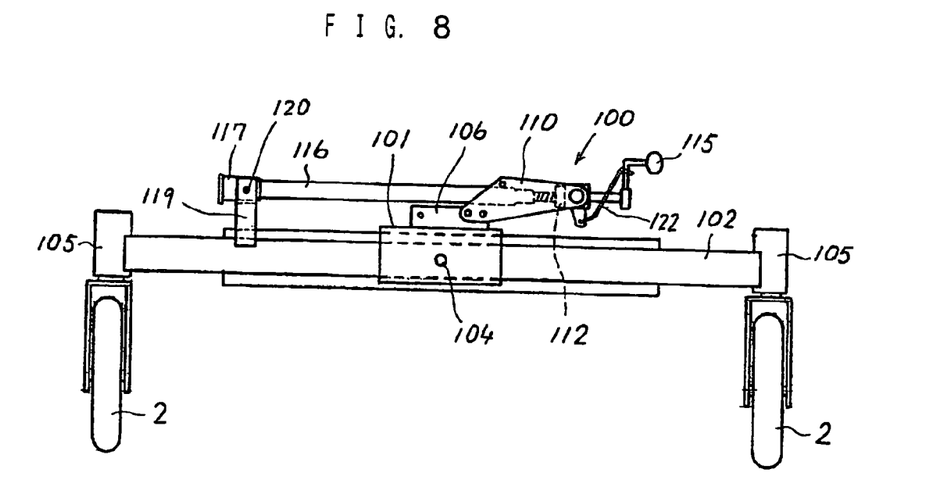
FIG. 8 is a front view when a jack is retracted.
Figure 9:
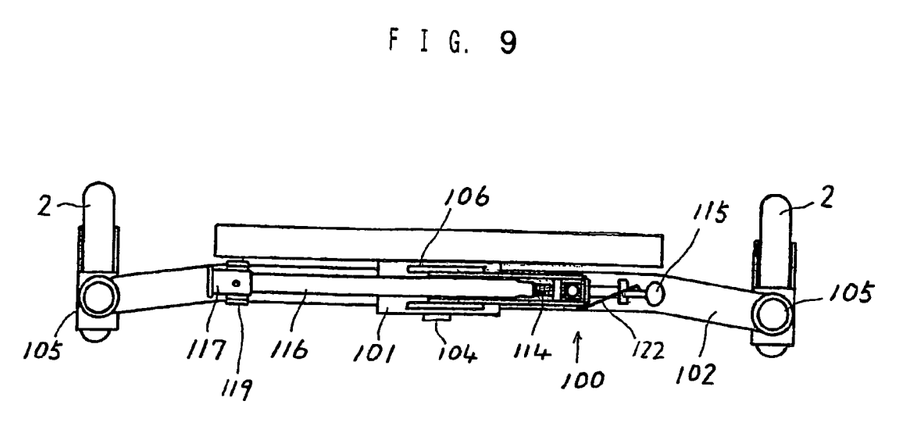
FIG. 9 is a plan view when a jack is retracted.

FIG. 7 through FIG. 9 show a condition where the jack 99 has been stored on the front-wheel supporting pipe 102. For storing the jack 99, the jack 99 is turned upward around a pivotal supporting portion 113 supporting the piece 112, and without change, the receiving frame 106 is turned by 90 degrees in the right and left direction around the vertical pin 108. Then, one of the pins 109 and 109 fixing the mast 110 is extracted to turn the mast 110 as shown in FIG. 8; the stand 117 is placed on a supporting member 119 fixedly fitted on the front-wheel supporting pipe 102, and this is fixed by a pin 120. Herein, numerical symbol 122 in the drawing denotes a stopper composed of a spring member as a whirl stop of the handle 115. This stopper 122 is mounted so as to be turnable around a fulcrum 123, and latches a V-shaped bent portion formed in a middle part with the handle 115 so as to prevent the handle 115 from freely rotating as a result of vibration, etc.

Next, based on FIG. 12 through FIG. 17, description will be given of a mowing height setting device 175. An operation panel 176 is provided on a side of the operator's seat 28. This operation panel 176 is provided with a dial operation-type mowing height setting device 175 for setting a mowing height of grass by controlling a lowering position of the mower 43.

A part of a circumferential portion of a dial operating portion 175a is fitted onto an opening portion provided on an upper part of the operation panel 175, and this operating portion 175a is supported, on an anteroposterior shaft 176p below the operation panel 176 and along the sheet frame 88.

In addition, at circumferential portions of the dial operation 175a, turning operation concavities (notch portion) 175b, are formed at a predetermined interval, and a leaf spring-like stopper 175d is mated with this concavity 175b, so that a setting position of the dial operation portion 175a is not unexpectedly changed. In addition, one-end portion of a push-pull wire 175e to serve as a mechanical interlocking member is connected to a plate surface portion of the dial operating portion 175a, and the other-end portion of this push-pull wire 175e is coupled to a latching plate 190, which will be described later (see FIG. 17). This latching plate 190 controls a lowering position of the mower 43.

Figure 16:
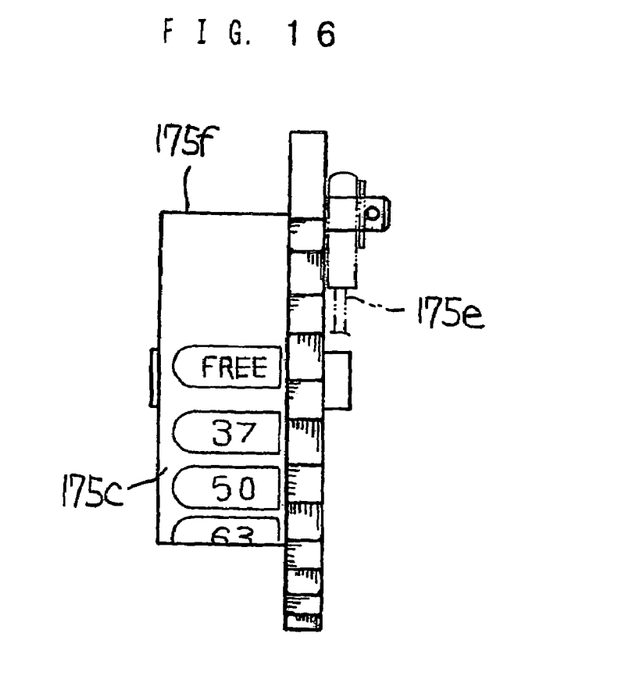
FIG. 16 is a side view of a dial operating portion.

Furthermore, at a plate surface front part of the dial operating portion 175a, a cylindrical portion 175f is provided as shown in FIG. 16, and a mowing height display surface 175c is provided on the outer circumferential surface of this cylindrical portion 175f.

Accordingly, a mowing height of the mower, namely, a lowering position of the mower can be arbitrarily set by pressing the outer circumferential surface of the dial operating portion 175a with fingers or a palm to turn the same around the shaft 176P.

Figure 17:
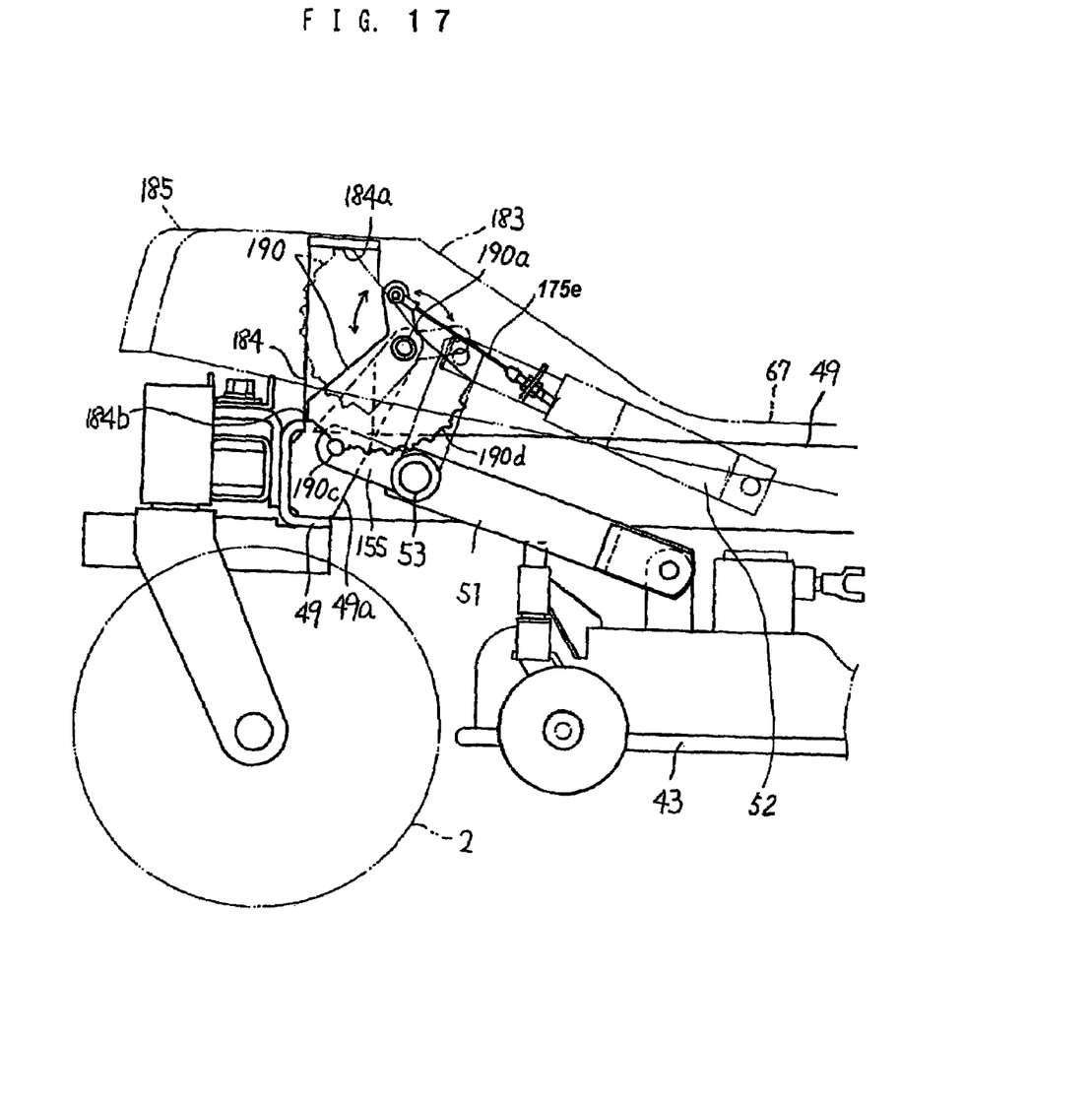
FIG. 17 is a side view of a floor front part showing latching plate actions.

In addition, the mowing height display surface 175c of the cylindrical portion 175f is fitted onto a height display window 175j. Then, simultaneously with a turning operation of the dial operating portion 175a, the push-pull wire 175e is pushed and pulled, whereby the mower 43-side latching plate 190 as shown in FIG. 17 is turned and adjusted.

Moreover, the operation panel 176 is provided with a mower elevating lever 177, an hour meter 178, a key switch 180, a fuel meter 181, a pilot lamp 182, etc.

Next, description will be given of a structure around the latching plate 190 to control a lowering position of the mower 43 based on FIG. 17. On the front-side, link pieces 51 and 51 coupling and supporting the front part of the mower 43, a pair of right and left arms 155 and 155 extending forward integrally therewith are provided, and a stopper pin 190c in the right and left direction is provided between front end portions of both these arms 155 and 155.

In addition, a bracket 49a is provided in a standing condition from the front frame 49 obliquely upward and backward, and on the same bracket 49a, a supporting shaft 190a in the right and left direction is provided. The fan-shaped latching plate 190 having multiple latching nails 190d is supported so as to be freely turnable on this shaft 190a. In addition, the multiple latching nails 190d are formed so that the irrespective distances from the supporting shaft 190a become gradually distant from the rear side to the front side, and the stopper pin 190c is latched with these latching nails 190d.

Thereby, when the dial operating portion 175a is operated to turn, the latching plate 190 is turned around the supporting shaft 190a as a result of a pushing and drawing operation of the push-pull wire 175e, and the position where the stopper pin 190c is latched is changed. Thereby, the lower limit position of the mower 43 can be changed.

For example, when the latching plate 190 is positioned at a position of the solid lines in FIG. 17, the mower 43 is held at a high position from the ground and thus results in a high mowing condition. As a result of a pull of the push-pull wire 175e, when the latching plate 190 is turned upward as shown by the hypothetical lines, the mower 43 is held at a low position and results in a low mowing condition.

Herein, elevation of the mower 43 is carried out by a turning operation of the mower elevating lever 177. The piston of the hydraulic cylinder 52 is expanded and contracted to elevate the mower 43 when this elevating lever 177 is moved back and forth.

In addition, at a front part of the step 67, a front step 183 bulging out upward is provided, and on the lower surface of this front step 183, a support frame 184 which is a rectangular shape when being viewed head-on is provided. The latching plate 190 turns within a range between an upper-plate lower surface 184a and a lower-plate upper surface 184b of the support frame 184, and the latching plate 190 no longer turns when coming into contact with the upper-plate lower surface 184a or lower-plate upper surface 184b of the support frame 184.

Herein, a notation position "FREE" in FIG. 16 indicates a condition where the latching plate 190 is in contact with the upper-plate lower surface 184a of the step support frame 184, and in this condition, the mower 43 is at a position lowered to the maximum.

Since such a construction as in the above is provided, an operator can appropriately change the mowing height while remaining on the vehicle body, and in comparison to the construction as in the prior art where an operator gets off the vehicle body to set a lowering position of the mower, adjustment can be easily carried out in the embodiment of the present invention. In addition, in the present invention's embodiment, since a wire member is employed as a mechanical interlocking mechanism to connect the setter 175a and latching plate 190, the mowing height setting device 175 can be constructed at a low price. In addition, the front floor 183 is supported by the step support frame body 184 attached to the front frame 49, and the upper and lower plate surfaces of this step support frame body 184 are utilized as stoppers when the latching plate 190 turns in the up and down direction. Therefore, no extra components are required, and a riding mower can be provided at a reasonable price. Moreover, the riding mower has a feature in that deformation of the front floor 183 itself can be prevented.

What is claimed is:

1. A riding mower comprising:

an engine arranged on a body;

a set of front wheels and a set of rear wheels supported on the body and provided on a right and a left, each in pairs toward a forward direction;

a pair of hydrostatic transmissions (HSTs) driven by receiving revolution power of the engine, for rotating the pair of rear wheels in a forward rotation direction or a reverse rotation direction;

a mower positioned in front of the pair of rear wheels and coupled to the body so as to be capable of being lifted up and down;

a step provided above the body;

a brake pedal for braking the pair of rear wheels, provided upward of the step;

a parking operation member for maintaining a step-on condition of the brake pedal;

a pair of mower elevating links for coupling between the body and mower;

a lift shaft for rotating the pair of elevating links, respectively, provided in a right and left direction at a side connecting portion to the body in the pair of elevating links;

a hydraulic cylinder for elevating the mower by rotating the lift shaft; and a rotating shaft of the brake pedal provided concentrically with the lift shaft.

* * * * *